United States Patent [19]
Matsui

[11] Patent Number: 4,928,935
[45] Date of Patent: May 29, 1990

[54] MOUNTING ARRANGEMENT FOR AUTOMOTIVE ENGINE OR THE LIKE HAVING MULTIPLE VARIABLE ORIFICES

[75] Inventor: Shinichi Matsui, Yokosuka, Japan
[73] Assignee: Nissan Motor Co., Ltd., Japan
[21] Appl. No.: 315,925
[22] Filed: Feb. 27, 1989
[30] Foreign Application Priority Data
Feb. 29, 1988 [JP] Japan .................................. 63-46542
[51] Int. Cl.$^5$ ................................................ F16F 9/34
[52] U.S. Cl. .................................. 267/140.1; 267/218
[58] Field of Search ...................... 188/267, 299; 267/140.1, 140.1 A, 140.1 AE, 218, 219

[56] References Cited
U.S. PATENT DOCUMENTS

| 3,599,428 | 8/1971 | Chaney . | |
|---|---|---|---|
| 4,559,534 | 7/1988 | Härtel | 267/140.1 AE |
| 4,671,227 | 6/1987 | Hollerweger et al. . | |
| 4,720,087 | 1/1988 | Duclos et al. | 267/140.1 |
| 4,742,998 | 5/1988 | Schubert | 267/140.1 AE |
| 4,757,981 | 7/1988 | Hartel | 267/140.1 |
| 4,773,632 | 9/1988 | Hätel | 267/140.1 E |

FOREIGN PATENT DOCUMENTS 60-104828 6/1985 Japan .
61-74930 4/1986 Japan .
0072934 4/1988 Japan ......................... 267/140.1 AE

OTHER PUBLICATIONS

Scientific American, "Phase Transition Electrorheological Fluids Flourish in Drought", Sep. 1988, p. 22.

Primary Examiner—Duane A. Reger
Attorney, Agent, or Firm—Leydig, Voit & Mayer

[57] ABSTRACT

In order to attenuate low and intermediate frequency vibration ranges a mounting device is provided with two electronically controlled variable orifices. During low frequency vibrational ranges one is left either de-energized or partially energized to permit either free or limited communication between a main working chamber and a first auxiliary or expansion chamber, while the other is fully energized to close communication between the main chamber and a second auxiliary chamber. When the higher vibrational range is entered the first orifice is conditioned to cut off communication with the first auxiliary chamber and while the second is de-energized. The passage structure in the second orifice unit is designed to induce the fluid therein to undergo resonance when the higher vibration frequency is applied thereto.

9 Claims, 3 Drawing Sheets

FIG. 4
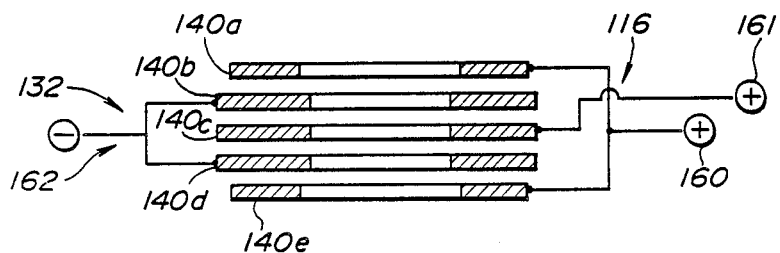
FIG. 5
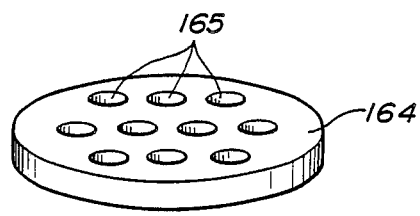
FIG. 6
FIG. 7
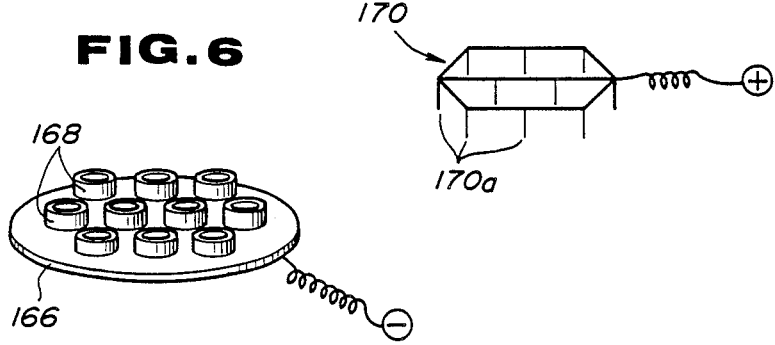

MOUNTING ARRANGEMENT FOR AUTOMOTIVE ENGINE OR THE LIKE HAVING MULTIPLE VARIABLE ORIFICES

BACKGROUND OF THE INVENTION

1. Field of the Invention

The present invention relates generally to damping devices of the nature used to support vibrating bodies, and more specifically to damping device which is particularly suited to automotive applications and which features two orifices which are arranged to improve the vibration damping characteristics of the unit.

2. Description of the Prior Art

JP-A-60-104828 describes an example of damping type unit which takes the form of a hollow elastomeric bush member which is filled with an electrorheogical fluid (or ERF as it will be referred to hereinafter) and which is further provided with an electrically controlled orifice unit which divides the device into a working chamber and an expansion chamber. With this device when the bush is compressed, fluid is displaced from the working chamber into the auxiliary one (defined between the orifice unit and a relative flexible diaphragm) and vice versa. By applying a high voltage to across the electrodes of the orifice, the viscosity of the ERF can be induced to undergo a remarkable increase and the fluid induced to assume to an almost solid state. Under these conditions the orifice is either effectively blocked or the restrictive properties thereof remarkably increased. When this type of arrangement is used to support automotive engines for example, it is possible to improve the effective vibration damping characteristics of the system defined by the engine, mounts and vehicle chassis particularly at low frequencies. For example, when the engine is idling or undergoes what shall be referred to as engine shake, the vibrations produced exhibit low frequency large amplitude characteristics.

However, this type of arrangement has suffered from the drawback that even though the above vibration attenuation tends to be very effective in the vibration frequency range in which idle and shake and vibration occur, the device has proven somewhat ineffective in that the spring constant of the device tends to be raised excessively in that the vibration frequency range in which reverberation noise is produced in the vehicle cabin.

In this specification it will be assumed for the sake of discussion that the engine "shake" vibrations exhibit a frequency in the order of 10 Hz while the engine "idling" vibrations exhibit a frequency in the order of 25 Hz. On the other hand, the vibrational range in which the reverberation tends to occur line in the 80–100 Hz region.

SUMMARY OF TH INVENTION

It is an object of the present invention to provide a damping arrangement which features the use of an ERF fluid and an orifice arrangement which enables the selective control of vibrations which occur in at least two discrete vibrational ranges and therefore enable the attenutation in the vibrational regions in which engine shake and idling occur as well as the vibrational frequency range in which reverberation noise tends to be generated.

In brief, the above object is achieved by an arrangement wherein in order to attenuate low and intermediate frequency vibration ranges a mounting device is provided with two separate electronically controlled variable orifices. During low frequency vibrational ranges one is left either de-energized or partially energized to permit either free or limited communication between a main working chamber and a first auxiliary or expansion chamber, while the other is fully energized to close communication between the main chamber and a second auxiliary chamber. When the higher vibrational range is entered the first orifice is conditioned to cut off communication with the first auxiliary chamber and while the second is de-energized. The passage structure in the second orifice unit is designed to induce the fluid therein to undergo resonance when the higher vibration frequency is applied thereto.

A first aspect of the present invention is deemed to comprise a variable viscosity type vibration damper which features: first and second connection assemblies, the first and second connection assemblies being arranged to be connectable to first and second bodies, one of the bodies being subject to vibration; a hollow elastomeric body, the hollow elastomeric body being fixedly connected with the first and second connection assemblies in a manner to define an enclosed space; and first and second orifice units connected to the first and second assemblies respectively, the first and second orifice units being disposed in a manner to partition the enclosed space into a main fluid chamber and first and second auxiliary chambers respectively, the main and first and second auxiliary chambers containing a fluid which exhibits an increase in viscosity when a voltage is impressed thereon.

A second aspect of the present invention is deemed to comprise a method of damping vibration using a damper which includes, first and second orifice units, the first and second orifice units being disposed between a main working chamber and first and second auxiliary chambers respectively, the main and auxiliary chambers being filled with a fluid which undergoes a change in viscosity when a voltage is impressed thereon, the steps comprising: attenuating vibration having a first frequency by conditioning the second orifice unit to block fluid communication between the working chamber and the second auxiliary chamber, and conditioning the first orifice unit to provide a first high level of communication between the working chamber and the first auxiliary chamber; attenuating vibration having a second frequency by conditioning the second orifice unit to block fluid communication between the working chamber and the second auxiliary chamber, and conditioning the first orifice to provide a second restricted level of communication between the working chamber and the first auxiliary chamber, the second restricted level of communication being provided through first passage means which is arranged to induce the fluid therein to undergo resonance when vibration having the second frequency is applied thereto; and attenuating a vibration having a third frequency by conditioning the second orifice unit to permit communication between the working chamber and the second auxiliary chamber via second passage means which is arranged to induce the fluid therein to undergo resonance when vibration having the third frequency is applied thereto, and conditioning the first orifice unit to block communication between the working chamber and the first auxiliary chamber.

BRIEF DESCRIPTION OF THE DRAWINGS

FIG. 4 is a schematic view showing the disposition of the plates which define the electrodes in the orifice unit shown in FIGS. 2 and 3 and the manner in which they are connected with a source of high voltage; and FIGS. 5 to 7 are perspective views showing the construction of the orifice unit disposed in the upper section of the device shown in FIG. 1.

DESCRIPTION OF THE PREFERRED EMBODIMENTS

Figure 1:
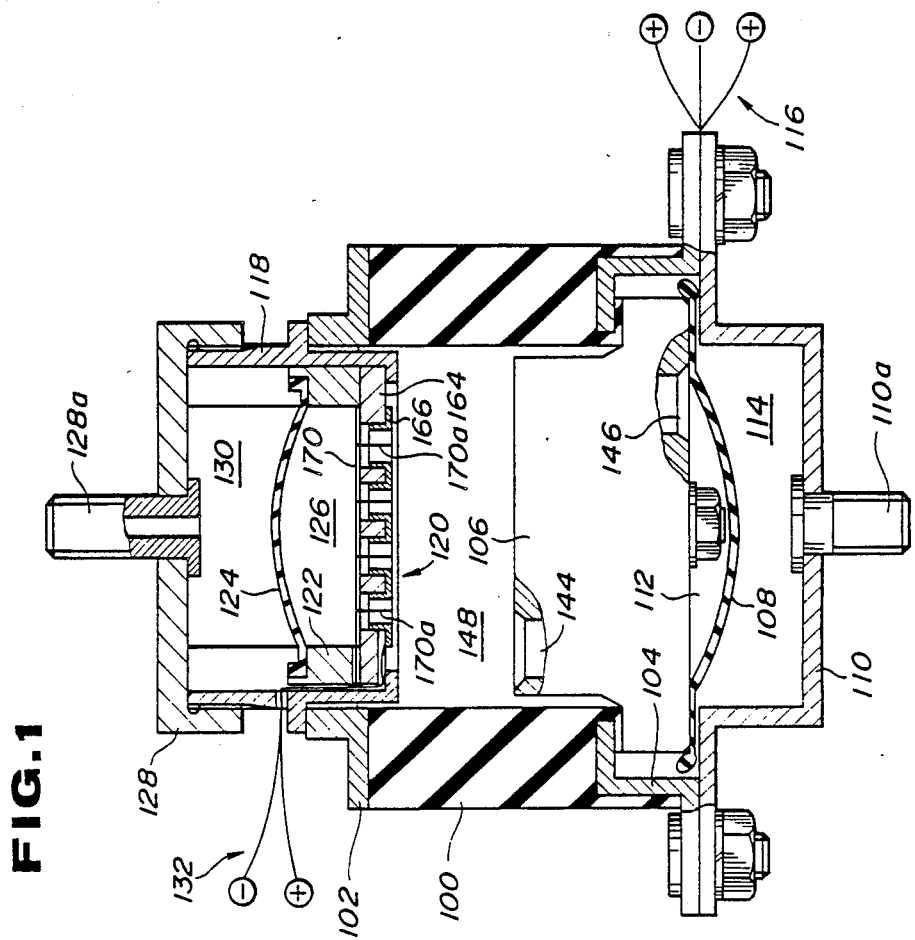
FIG. 1 is a sectional elevation showing details of the mounting device according to the present invention.

FIG. 1 is a sectional elevation showing an embodiment of the present invention. This arrangement comprises a hollow elastomeric body 100 which is vulcanized or similarly fixedly fastened at its upper and lower ends respectively, to annular plate members 102 and 104.

A first orifice unit 106 is disposed in the mouth of the lower annular plate member 104 and arranged to engage a lip-like flange portion of the elastomeric body 100 which wraps around the inner peripheral edge of an inwardly extending flange portion formed on the upper end of the lower annular plate member 104.

A first flexible diaphragm 108 is placed against the lower end of the first orifice unit 106 and sandwiched thereagainst by a lower cap member 110 which is bolted to the lower annular plate member 104 in the illustrated manner. The first diaphragm 108 is arranged to define a first auxiliary or expansion chamber 112 between itself and the lower face of the first orifice unit 106.

The lower cap member 110 defines a lower air chamber 114 therein.

A first set of electrical lead lines 116 (in this case three) is sealingly disposed between the lower cap 110 and the lower annular plate member 104 and operatively connected with the first orifice unit 106.

An annular sleeve 118 is disposed in the opening of the upper annular plate member 102 and connected thereto in a manner wherein a hermetic seal is established therebetween. A second orifice unit 120 is disposed within the sleeve 118 and arranged to seat on an inwardly extending flange formed about the lower end of the same. An annular ring 122 is disposed in the sleeve 118 and arranged to seat on top of the orifice unit 120. As shown, the annular ring 122 has a second flexible elastomeric diaphragm 124 bonded or vulcanized thereto. This diaphragm 124 is arranged to define a second auxiliary or expansion chamber 126 within the sleeve and on the outboard side of the second orifice unit 120.

An upper cap 128 is fixedly connected to the upper end of the sleeve 118 and arranged to define an air chamber 130 within the sleeve 118 between the diaphragm 124 and itself.

A second set of electrical lead lines 132 is arranged to pass through a bore formed in the sleeve 118 at a level above the diaphragm 124 and to be operatively connected with the second orifice unit 120.

The upper and lower cap members 128, 110 are provide with connection studs 128a, 110a which serve to connect the mounting device between the engine (transaxle by way of example) and a vehicle chassis. The studs 128a, 110a are, in this instance, formed with a coaxial bores via which air chambers 114, 130 defined on the outboard sides of the first and second flexible diaphragms 108, 124 are communicated with the ambient atmosphere. However, this ventilation arrangement can be changed as deemed appropriate and/or convenient.

Figure 2:
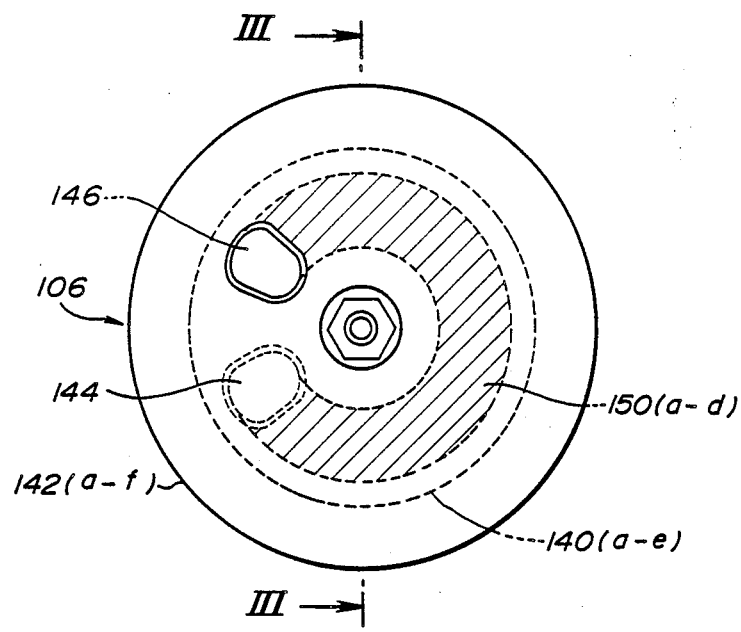
FIG. 2 is a sectional view of the device depicted in FIG. 1 showing details of the construction and arrangement of the variable orifice unit disposed in the lower section of the device.
Figure 3:
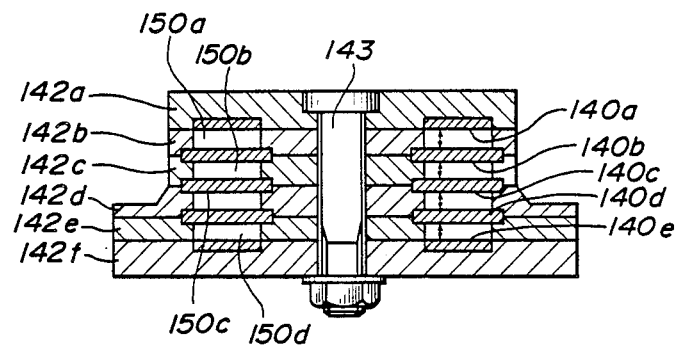
FIG. 3 is a side sectional view of the orifice unit shown in FIG. 2 as taken along section line III—III.

FIGS. 2 to 4 show details of the construction and arrangement of the first orifice unit. In this embodiment, the first orifice unit 106 is comprised of a plurality of first and second circular plates, the plates being arranged in the illustrated manner. In this embodiment the first set of plates 140a-140e comprise electrodes while the second set 142a-142f are insulating spacers which are designed to cooperate to define a body in which the electrode plates 140a-140e are supported. The electrode defining plates 140a-140e are interleaved with the insulating spacer bodies 142a-142f and supported thereby in a manner to be spaced by a distance of δ.

A bolt 143 is disposed through a coaxial bore formed in the insulating spacer plates 142a-142f and arranged to secure the two sets of plates together in a manner to define a single hermetically closed unit.

First and second ports 144, 146 are formed in the first orifice unit 106. The first port 144 is arranged to open into the main with the main working chamber 148 which is defined within the elastomeric body 100 between the first and second orifice units 106, 120; and to communicate with a first set of corresponding ports (not shown) which are formed in all but the lowermost insulating spacer plate 142f and which are aligned with the first port 144, in a manner to define a blind bore-like structure. With this arrangement the C shaped arcade passages 150a-150d defined between the electrode plates 140a-140e are placed in fluid communication with the main fluid or working chamber 148. However, as will be appreciated direct communication between the main and first auxiliary chambers 148, 112 is prevented.

The second port 146 is arranged to open into the first auxiliary chamber 112 and communicate with a second set of ports (not shown) which are formed in all but the uppermost insulating plate 142a. With this arrangement the passages 150a-d defined between the electrode plates 140a-e are placed in fluid communication with the first auxiliary chamber 112.

With this arrangement a series of parallel passages (viz., those defined between each of the electrode plates 140a-e) establish fluid communication between the chambers 148 and 112.

The electrode defining plates 140a-e are arranged to be operatively connected with a source of high voltage (not shown per se) in the manner shown in FIG. 4. Viz., plates 140a and 140e are arranged to be connected to a first terminal 160 (in this case a first positive terminal), plate 140c is connected to a second terminal 161 (also a positive terminal) while the remaining plates 140b and 140d are connected to the third (negative) terminal 162. As will be appreciated, with this arrangement it is possible to selectively impress a positive voltage on plate 140c alone, or plates 140a, and 140e, or all three (140a, 140c and 140e) at once. This arrangement permits a selective control over the change in respective characteristics and throttling effect of the first orifice unit 106 and therefore enable the selective attenuation of engine idling vibration and engine shake.

In order to control vibration generated when the engine is idling, all of the electrodes of the first orifice arrangement are left in a de-energized state. This permits the ERF in the passages to remain at a low viscosity to flow back and forth through all of the passages in a manner which induces a reduction in dynamic spring constant.

On the other hand, when the device is conditioned to attenuate engine shake, the ERF in channels 150a and 150d is induced to undergo an increase in viscosity by constantly applying voltages to plates. This causes channels to "stick" and leave channels 150b and 150c only open. These channels are dimensioned so that under these conditions the fluid therein is excited to its resonance frequency by the vibration applied to the device.

By selectively applying a voltage to the second terminal 161 in an ON/OFF manner the ERF in the channels 150b and 150c can be selectively induced to undergo marked increases and decreases in viscosity and therefore enable the control of the resonance characteristics of the first orifice unit 106 under such conditions.

FIGS. 5 to 7 the constructional details arrangement of the second orifice unit 120 which is disposed in the upper portion of the device.

As shown, this arrangement comprises a circular cover member 164 which is formed of an electrically insulating material and in which a plurality of circular openings 165 are formed; and a circular base member 166 which is formed of an electrically conductive material and is formed with a plurality of short vertically extending tubes 168. The cover 164 is arranged to seat on the base 166 in a manner wherein the openings 165 are aligned with the tubes 168 and thus define a plurality of circular cross-sectional passages which provide fluid communication between the main working chamber 148 and the second auxiliary chamber 126. A grid-like arrangement 170 is fixed to the top of the cover and arranged so that each of the depending leg-like portions 170a of the same, extends coaxially through one of the tubes formed on the base member. In this embodiment the grid 170 is connected with a positive terminal while the base 166 is connected with a negative one. Accordingly, the grid 170 and the base 166 are arranged to act as positive and negative electrodes of the second orifice unit 120.

When a high voltage is applied to the electrodes of the second orifice unit 120, the ERF undergoes a sudden increase in viscosity and "sticks" in the passages.

In this embodiment the second orifice unit 120 is designed (tuned) in a manner wherein the while the electrodes are left de-energized, the liquid contained in the passages undergoes resonance when an exciting vibration which is applied to the device and causes a change in the volume of the main working chamber 148, falls in the 80–100 Hz range. Viz., the range at which reverberation noise tends to be produced in the vehicle cabin.

It will be noted that in the case of a four cylinder engine most powerful vibration produced is the so called secondary vibration and is such that this vibration exhibits a frequency which falls in the above mentioned vibrational frequency range, when the engine is operating in the 2400–3000 RPM range.

In brief, with the above described arrangement, when the engine is idling, the vibration which is applied to the device induces a deformation of the elastomeric bush in a manner which changes the volume of the main working chamber. Under these conditions the second orifice unit is energized to close off communication between the main working chamber 148 and the second auxiliary chamber 126 located in the upper part of the device and in accordance with the volume change the ERF is displaced between the main chamber 148 and the first auxiliary chamber 112.

In the low frequency range, when shake type vibrations are generated, the first orifice arrangement is energized in addition to the second one in the manner referred to above, and the combination functions to provide an attenuating effect. When the frequency increases and reaches the mid frequency zone, the second orifice unit 120 is de-energized and the multiple tubular passages utilized to attenuate vibrations which tend to induce reverberation noise in the vehicle cabin.

More specifically, when the vibrations produced fall in the idling frequecy range, a voltage is impressed across the electrodes 166 and 170a of the second orifice unit 120 while the electrode plates 140a–e are all conditioned to assume a non-energized state (OFF). This causes the ERF in the tubular passage to gel and to induce the so called "orifice stick" while permitting fluid to flow back and forth through all of the parallel passages 150a–d. Under these conditions, the communication between the main working chamber 148 and the second auxiliary chamber 126 is cut off, while communication between said main working chamber 148 and the first auxiliary chamber 112 is maximized. This reduces the dymanic spring constant of the device and enables the idling vibration to be effectively attenuated.

When the vibrations shift into the engine shake vibrational range, the first and third terminals 160 and 162 are appropriately connected with a source of voltage in a manner to induce the ERF in passages 150a and 150d to gel and to leave only passages 150b and 150c open. At this time the energization of the second orifice unit 120 is maintained. As mentioned above, passages 150b and c are arranged so that the fluid therein is induced to resonate by the vibrational energy applied to the device under these conditions. Suitable ON/OFF type application of a positive voltage to the second terminal 161 facilities selective control of the shake vibration by controlling the timing with which passages 150b and 150c are conditioned to permit and prevent the passage of fluid between the chambers between which they extend.

It should be noted however, that if the second orifice 120 is conditioned in a manner to permit the communication between the main and second auxiliary chambers 148 and 126, a notable detrimental reduction of the expansive spring characteristics and the loss of the setting (tuning) of the elastomeric body 100, tends to occur during the idling and shake attenuation modes of operation.

When the frequency of the applied vibration rises into the zone in which reverberation tends to be produced the energization of the second orifice unit is stopped thus opening the tubular passages which interconnect the main and second auxiliary chambers 148, 126. At the same time, all of the electrode plates of the first orifice unit are energized to cause the ERF in all of the passage 150a to 150e to gel and to close off communication between the main and first auxiliary chambers 148 and 112. As all of the fluid which is displaced by the volume change in the main working chamber 148 is induced to pass through the plurality of passages defined in the second orifice arrangement 120 and the passages are designated to induce the fluid therein to undergo resonance under such conditions, the vibration which is applied to the device tends to be effectively converted.

Further, under these conditions the communication between the chambers 148 and 126 allows for a reduction in the expansive spring constant of the device and permits the levels of the dynamic and static constants be lowered.

It is further envisaged to, during middle engine rotational speed modes, monitor the vibration generated; establish a slice level; and to control the energization of the first and second orifice units in accordance with the level of vibration with respect to the slice level. Viz., when the vibration falls below the slice level, the device is conditioned for shake attenuation while when the level is exceeded, conditioning for reverberation attenuation is induced.

With the above disclosed embodiment, it will be noted that as the second orifice unit is arranged in manner to have a plurality of passages which lead from the main working chamber 148 to the second auxiliary chamber, 126 it is easy to effect a large change in the cross-sectional area via which communication is established and to dimension the passages in a manner which tunes the same to induce the fluid therein to undergo resonance in response to the relatively high frequency vibration produced during middle engine rotational speed operation.

Further, as a relatively large number of tubular passages formed in the second orifice unit, the diameter of each passage is relatively small and the member which defines the positive electrode in each extends coaxially therethrough, the voltage which is required to induce gelling of the ERF and the "sticking" of the orifice is reduced. The small diameter of the rod-like positive electrode members 170a also permits the resistance of the passages to fluid flow to be kept at an acceptably low level and thus facilitates a large reduction in the dynamic spring constant during periods when the fluid in the passages is resonating.

Of course it will be understood that, even though the preceding disclosure has been given in connection with automotive applications and in particular, engine mounts, the present invention is not limited to the same and can find advantageous application in any field where damping of vibrations which extend over a relatively wide range is required.

For further details relating to the construction and arrangement of the type of mounting arrangement to which the instant invention is directed, reference can be had to the following documents:

1. U.S. Ser. No. 07/263,156 filed on October 27, 1988 in the name of MATSUI;
2. U.S. Ser. No. (Not yet available) filed on November 2, 1988 in the name of SATO;
3. U.S. Ser. No. 214,566 filed on July 1, 1988 in the name of DOI et al;
4. U.S. Ser. No. 07/231,014 filed on August 11, 1988 in the name of TABATA; and
5. U.S. Ser. No. 221,570 filed on July 20, 1988 in the name of DOI et al.

The content of the above mentioned documents is hereby incorporated by reference thereto.

What is claimed is:

1. A variable viscosity type vibration damper comprising:

first and second connection assemblies, said first and second connection assemblies being arranged to be connectable to first and second bodies, one of said bodies being subject to vibration;

a hollow elastomeric body, said hollow elastomeric body being fixedly connected with said first and second connection assemblies in a manner to define an enclosed space; and first and second independent orifice units connected to said first and second connection assemblies respectively, said first and second orifice units being disposed in a manner to partition said enclosed space into a main fluid chamber and first and second auxiliary chambers respectively, said first and second orifice units including means for selectively and individually varying throttling effect provided thereby so that the throttling effect of one of said first and second orifice units can be varied independently of the other.

2. A variable viscosity type vibration damper comprising:

first and second connection assemblies, said first and second connection assemblies being arranged to be connectable to first and second bodies, one of said bodies being subject to vibration;

hollow elastomeric body, said hollow elastomeric body being fixedly connected with said first and second connection assemblies in a manner to define an enclosed space; and first and second independent orifice units connected to said first and second connection assemblies respectively, said first and second orifice units being disposed in a manner to partition said enclosed space into a main fluid chamber and first and second auxiliary chambers respectively, said first and second orifice units inlcuding means for selectively and individually varying the throttling effect provided thereby so that the throttling effect of one of said first and second orifice units can be varied independently of the other said first orifice unit being constructed to damp vibration having a first frequency and said second orifice unit being constructed to damp vibration having a second lower frequency, said first orifice unit comprising a plurality of plate type electrodes which define a plurality of conduits therebetween.

3. A variable viscosity type vibration damper comprising:

first and second connection assemblies, said first and second connection assemblies being arranged to be connectable to first and second bodies, one of said bodies being subject to vibration;

a hollow elastomeric body, said hollow elastomeric body being fixedly connected with said first and second connection assemblies in a manner to define an enclosed space; and first and second independent orifice units connected to said first and second connectin assemblies repsectively, said first and second orifice units being disposed in a manner to partition said enclosed space into a main fluid chamber and first and second auxiliary chambers respectively, said first and second orifice units including means for selectively and individually varying throttle effect provided thereby so that the throttling effect of one of said first and second orifice units can be varied independently of the other, said first orifice unit comprising a plurality of electrically conductive plates, said plurality of conductive plates being operatively connected with first, second and third terminals, said conductive plates being arranged essentially parallel to one another, said first, second and third terminals being arranged to be selectively connected with a source of high voltage in a manner to enable voltages to be selective impressed across selected one of said plurality of conductive plates;

a plurality of non-conductive spacers, said spacers being so constructed and arranged to support and enclose said conductive plates in a manner to define a plurality of passages between said conductive plates, said spacers and conductive plates being formed with aperture means which permit said passage to communicate at a first end with said working chamber and communicate a second end with said first auxiliary chamber.

4. A vibration damper as claimed in claim 3 wherein said plurality of plates are arranged so that selective ones of the passage defined therebetween can be blocked and wherein the remaining passages are designed to induce the fluid contained therein to resonate when a vibration having a first predetermined frequency is applied thereto.

5. A variable viscosity type vibration damper comprising:

first and second connection assemblies, said first and second connection assemblies being arranged to be connectable to first and second bodies, one of said bodies being subject to vibration;

a hollow elastomeric body, said hollow elastomeric body being fixedly connected with said first and second connection assemblies in a manner to define an enclosed space; and first and second independent orifice units connected to said first and second connection assemblies respectively, said first and second orifice units being disposed in a manner to partition said enclosed space into a main fluid chamber and first and second auxiliary chambers respectively, said first and second orifice units including means for selectively and individually varying throttling effect provided thereby so that the throttling effect of one of said first and second orifice units can be varied independently of the other, said second orifice unit comprising means defining a plurality of essentially tubular passages which lead from said main chamber to said second auxiliary chamber, the walls of said passages being formed of an electrically conductive material and arranged to act as first electrodes of the second orifice unit;

a plurality of small diameter electrically conductive rods, each of said rods being arranged to extend essentially coaxially through said tubural passages, said rods acting as second electrodes of the second orifice;

said first and second electrodes being operatively connected with fourth and fifth terminals in a manner wherein a voltage can be impressed between each of the corresponding first and second electrodes.

6. In a method of damping vibration using a damper which comprises, first and second orifice units, said first and second orifice units being disposed between a main working chamber and first and second auxiliary chambers respectively, said main and auxiliary chambers being filled with a fluid which undergoes a change in viscosity when a voltage is impressed thereon, the steps comprising:

attentuating vibration having a first frequency by conditioning said second orifice unit to block fluid communication between said working chamber and said second auxiliary chamber, and conditioning said first orifice unit to provide a first high level of communication between said working chamber and said first auxiliary chamber;

attentuating vibration having a second frequency by conditioning said second orifice unit to block fluid communication between said working chamber and said second auxiliary chamber, and conditioning said first orifice to provide a second restricted level of communication between said working chamber and said first auxiliary chamber, said second restricted level of communication being provided through first passage means which is arranged to induce the fluid therein to undergo resonance when vibration having said second frequency is applied thereto; and attentuating vibration having a third frequency by conditioning said second orifice unit to permit communication between said working chamber and said second auxiliary chamber via second passage means which is arranged to induce the fluid therein to undergo resonance when vibration having said third frequency is applied thereto, and conditioning said first orifice unit to block communication between said working chamber and said first auxiliary chamber.

7. A vibration damper comprising:

first and second connection assemblies, said first and second connection assemblies being arranged to be connectable to first and second bodies, one of said bodies being subject to vibration;

a hollow elastomeric body, said hollow elastomeric body being fixedly connected with said first and second connection assemblies in a manner to define an enclosed space;

first and second variable orifice units connected to said first and second connection assemblies respectively, said first and second variable orifice units being disposed in a manner to partition said enclosed space into a main fluid chamber and first and second auxiliarly chambers respectively, said main and first and second auxiliary chambers being filled with a fluid; and first and second diaphragms, said first diaphragm separating said first auxiliary chamber from a first air chamber and said second diaphragm separating said second auxiliary chamber from a second air chamber.

8. A variable viscosity type vibration comprising:

first and second connection assemblies, said first and second connection assemblies being arranged to be connectable to first and second bodies, one of said bodies being subject to vibration;

a hollow elastomeric body, said hollow elastomeric body being fixedly connected with said first and second connection assemblies in a manner to define an enclosed space; and first and second separate electronically controlled variable orifice units connected to said first and second connection assemblies respectively, said first and second orifice units being disposed in a manner to partition said enclosed space into a main fluid chamber and first and second auxiliary chambers respectively, said first and second orifice units inlcuding means for selectively electronically controlling and individually varying throttling effect provided thereby so said first and second orifice units separately.

9. A varialbe viscosity type vibration comprising:
first and second connection assemblies, said first and second connection assemblies being arranged to be connectable to first and second bodies, one of said bodies being subject to vibration;
a hollow elastomeric body, said hollow elastomeric body being fixedly connected with said first and second connection assemblies in a manner to define an enclosed space; and
first and second separate electronically controlled variable orifice units connected to said first and second connection assemblies respectively, said first and second orifice units being disposed in a manner to partition said enclosed space into a main fluid chamber and first and second auxiliary chambers respectively, said main and first and second auxiliary chambers containing a fluid which exhibits an increase in viscosity when a voltage is impressed thereon said first and second orifice units including means for selectively electronically controlling said first and second orifice units separately.

* * * * *